United States Patent [19]

Ito et al.

[11] Patent Number: 4,839,579
[45] Date of Patent: Jun. 13, 1989

[54] RESISTIVE STEERING SENSOR

[76] Inventors: Wataru Ito; Tomoki Kubota; Koji Sumiya; Shoji Yokoyama, all c/o Aisin AW Co., Ltd., 10, Takane, Fujii-cho, Anjo-shi, Aichi-ken 444-11, Japan

[21] Appl. No.: 217,503

[22] Filed: Jul. 8, 1988

[30] Foreign Application Priority Data

Jul. 10, 1987 [JP] Japan .................. 62-173621

[51] Int. Cl.4 .................. G01R 27/02; B60Q 1/42
[52] U.S. Cl. .................. 324/63; 116/31; 340/870.38
[58] Field of Search .................. 116/31; 324/63, 65 R; 33/1 PT, 1 N; 340/870.38

[56] References Cited

U.S. PATENT DOCUMENTS

| 1,812,674 | 6/1931 | Bach | 116/31 |
| 2,754,499 | 7/1956 | Jost | 340/870.38 |
| 2,786,436 | 3/1957 | Arnot | 116/31 |
| 4,058,796 | 11/1977 | Oishi et al. | 340/575 |

Primary Examiner—Reinhard J. Eisenzopf
Assistant Examiner—Anthony L. Miele
Attorney, Agent, or Firm—Varndell Legal Group

[57] ABSTRACT

A steering sensor is installed in a vehicle by utilizing a clearance between a steering wheel and a turn signal switch assembly. This makes it possible to provide a steering sensor having a high degree of universality, since the sensor can be simply retrofitted on an existing vehicle not already having such a sensor. The steering sensor can be utilized widely in navigation or other systems requiring such a sensor.

2 Claims, 4 Drawing Sheets

RESISTIVE STEERING SENSOR

BACKGROUND OF THE INVENTION

This invention relates to a steering sensor installed in an existing automotive vehicle for the purpose of sensing steering angle.

In order to control the operation of an automotive vehicle, the ability to sense steering angle is not often a necessity in conventional applications. Therefore, rather than mounting a steering sensor in all models of automotive vehicles, the usual practice is not to equip ordinary vehicles with such a sensor. Accordingly, when it is desired to fit an automotive vehicle with a steering sensor, these circumstances make it necessary to install the sensor in advance, namely during the manufacturing phase, as far as the prior art is concerned. Consequently, the conventional steering sensor mounted on a vehicle is of an already fabricated type, with a light-transmissive photosensor being employed as this sensor.

In recent years, however, cases in which steering angle information is utilized in order to achieve various types of control in automotive vehicles have increased. For example, such information is utilized in controlling four-wheel drive vehicles and in navigation systems for guiding a vehicle to a certain destination.

More specifically, in order avoid a tight-corner braking phenomenon or slipping phenomenon in a four-wheel drive vehicle, it is necessary to sense the occurrence of these phenomena from steering angle and vehicle velocity and control a rotational speed differential mechanism for the front and rear wheels of the vehicle. Furthermore, in an arrangement where the condition of the road surface ahead of the vehicle is sensed and the vehicle is controlled based on the road surface condition in order to stabilize the maneuverability of a four-wheel drive vehicle, it is necessary that the condition of the road surface ahead of the vehicle be accurately grasped at all times by sensing the steering angle, and that this information be properly exploited.

In a configuration where a vehicle is equipped with a navigation system for automatically guiding the driver to a specific destination, a steering sensor is required as means for checking the route travelled. For example, when steering angle is sensed by a steering sensor, intersections can be recognized, and a specific intersection along the route can be verified by performing a calculation using intersection information and distance travelled, thereby making it possible to enhance the reliability of the navigation system. Accordingly, in order to equip an existing automotive vehicle with a navigation system, there is need of a steering sensor with which such a vehicle can be retrofitted in a simple manner.

However, the conventional steering sensor has a sensing section of a light-transmitting type, as mentioned above. Consequently, the conventional sensor is such that a light-emitting device and a light-receiving device are disposed in opposed relation between the rotary shaft of the steering system and a housing, and a certain amount of space is required for these structural reasons. In addition, since the conventional steering sensor is already fabricated, there is little freedom available as far as mounting is concerned. This makes it very difficult to retrofit an existing vehicle with the sensor, and the sensor has little universality since it can be used only in specific vehicle models.

Another problem is that since the light-transmissive photosensor employs a pulse counting arrangement, it is not possible to sense the absolute steering angle prevailing when the ignition switch is turned on.

SUMMARY OF THE INVENTION

Accordingly, an object of the present invention is to provide a steering sensor which has a high degree of universality and with which an existing automotive vehicle can be retrofitted in a simple manner.

According to the present invention, the foregoing object is attained by providing a steering sensor for an automotive vehicle having a steering wheel and a turn signal switch assembly, comprising a first gear mounted in a clearance between the steering wheel and the turn signal switch assembly, a second gear meshing with the first gear, and a variable resistor rotated by the second gear.

With the steering sensor of the invention, and as shown, for example, in FIG. 1, turning a steering wheel 32 rotates the rotary shaft of a variable resistor 40 through a first gear 38 and a second gear 39. The resistance value of the variable resistor 40, which corresponds to the angle of rotation of the rotary shaft, namely the absolute value of the steering angle, is detected.

Thus, in accordance with the invention, the steering sensor can be provided by utilizing a clearance A between the steering wheel 32 and the turn signal switch assembly 33. This makes it possible to provide a steering sensor having a high degree of universality, since the sensor can be retrofitted on an existing vehicle in a simple manner. The steering sensor can be utilized widely in navigation or other systems requiring such a sensor.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described with reference to the drawings.

Figure 4:
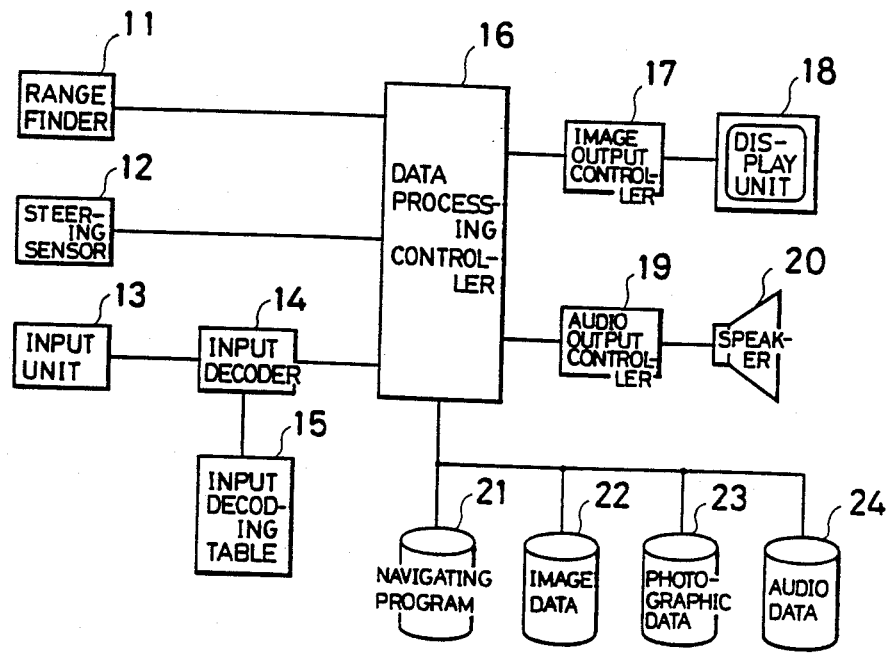
FIG. 4 is a block diagram illustrating an example of the structure of a navigation system to which the present invention is applied.

With reference first to FIG. 4, a navigation system to which the invention is applied includes a range finder 11 for measuring the distance travelled by an automotive vehicle. Examples of the range finder 11 include means for detecting and counting the number of revolutions of a wheel, means for detecting acceleration and double-integrating the result, etc. Other measuring means may also be employed. The navigation system further includes a steering sensor 12 for sensing whether the vehicle has turned at an intersection. As will be described below, the steering sensor 12 comprises a rotating-type variable resistor attached to a rotating part of the steering wheel. An input unit 13 is a joy stick, key or touch-type panel. Alternatively, the input unit 13 can be interlocked with the screen of a display unit 18, and a key or menu can be displayed on the screen to enable inputs to be made from the screen. An input decoder 14 is adapted to decode input data from the input unit 13 while referring to an input decoding table 15. When a course is to be set, for example, the present location of the vehicle and the destination are inputted in the form of codes, whereupon the input decoder 14 effects a conversion into present location data and destination data based on the codes by referring to the input decoding table 15. Accordingly, the input decoding table 15 is set in accordance with the data inputted from the input unit 13. A data processing controller 16 is the brain of the navigation system. When a course has been selected and set at the input unit 13, the controller 16 calls and executes a navigating program for this course from a file 21 storing the program. Each navigating program is designed to display an information map, which is in line with the course travelled, on the screen of the display unit 18, project characteristic photographs at intersections and at points along the curse, display remaining distances to intersections as well as other guidance information, and give audible information broadcast from a speaker 20. These images, photographs and audio data are stored in files 22 through 24, respectively. The outputting of images to the display unit 18 is controlled by an image output controller 17, and the outputting of audio to the speaker 20 is controlled by an audio output controller 19.

In accordance with the above-described navigation system, the driver selects a course by entering his present location and desired destination from the input unit 13 before travelling. When this has been accomplished, the data processing controller 16 reads and executes the navigating program in file 21 corresponding to this course. In accordance with the course, and on the basis of the measurement information from the range finder 11 and steering sensor 12, the navigating program displays the course information map, present location and the like, and informs the driver of characteristic features and intersections along the route, via the display unit 18 and speaker 20. When the steering angle is sensed by the steering sensor 12, intersections can be recognized. Specific intersections along the route travelled can be checked by performing computations using the intersection information and distance travelled.

Figure 3:
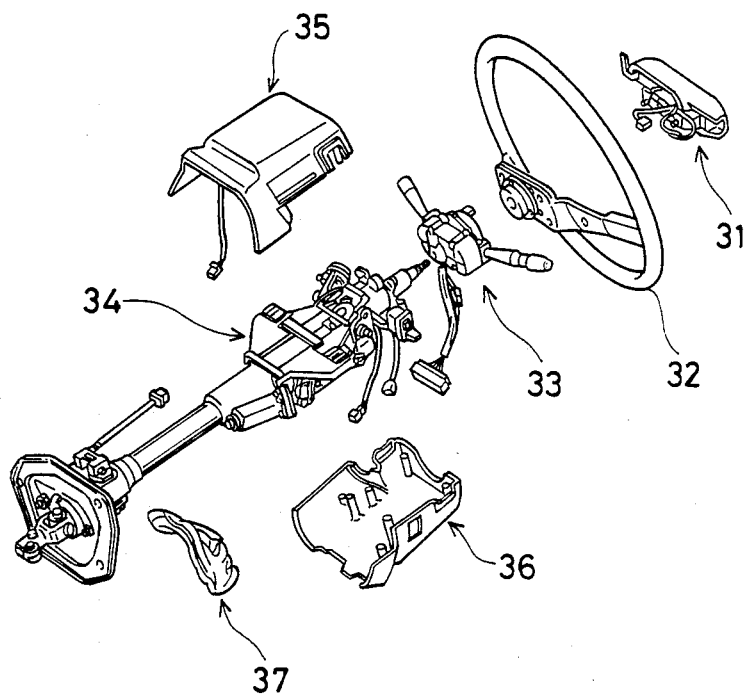
FIG. 3 is a perspective, exploded view useful in describing a steering structure.

A steering structure will now be described with reference to FIG. 3. The structure includes a horn 31, a steering wheel 32, a turn signal switch assembly 33, a steering column 34, and an upper cover 35, lower cover 36 and side cover 37 for covering the steering column 34.

Figure 1A:
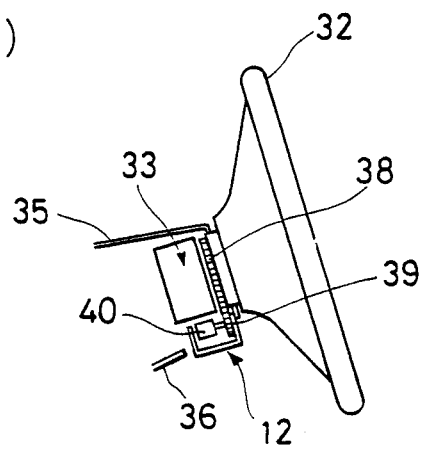
FIGS. 1(a) and 1(b) are assembled views illustrating an embodiment of a steering sensor according to the present invention.
Figure 1B:
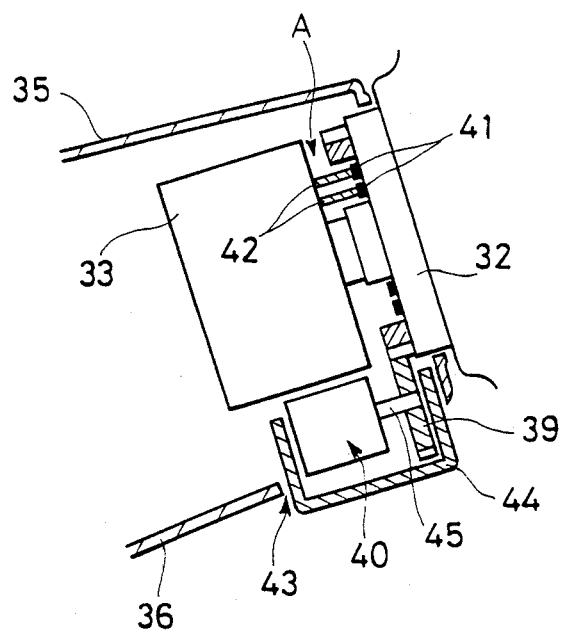
Figure 2:
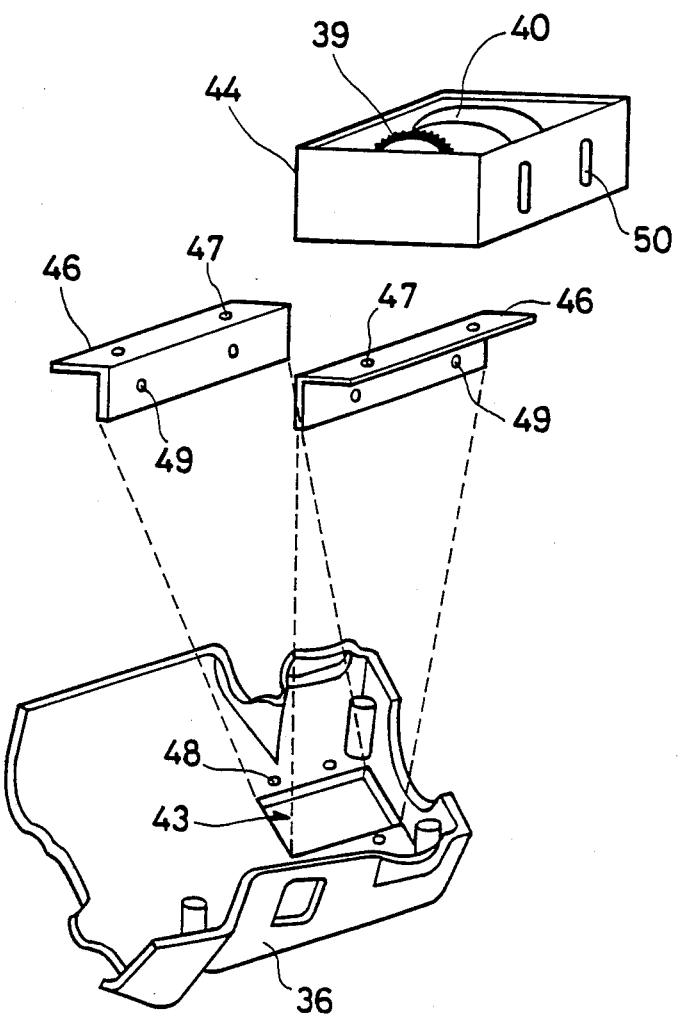
FIG. 2 is a perspective, exploded view illustrating the mounting structure of the steering sensor according to the present invention.

FIGS. 1 and 2 illustrate an embodiment of a steering sensor according to the present invention. Numeral 12 denotes the steering sensor, 32 the steering wheel, 33 the turn signal switch assembly, 38 a first gear, 39 a second gear, 40 a variable resistor, 41 a movable electrode, 42 a fixed electrode, 43 an opening in the lower cover 36, 44 a sensor case, 45 a rotary shaft, 46 an L-shaped fitting, 47, 48 and 49 bolt holes, 50 a slot, and A a clearance.

As shown in (a) of FIG. 1, the steering sensor 12 of the present invention comprises the first gear 38 mounted between the steering wheel 32 and the turn signal switch assembly 33, the second gear 39 meshing with the first gear 38, and the variable resistor 40 rotated by the second gear 39.

As shown in (b) of FIG. 1, the clearance A is formed between the steering wheel 32 and the turn signal switch assembly 33. The clearance A is a space provided so that the horn 31 (FIG. 3) disposed on the steering wheel 32 can be electrically connected. The two movable electrodes 41 are provided concentrically on the rear face of the steering wheel 32, and the two fixed electrodes 42 contacted by the movable electrodes 41 are provided on the turn signal switch assembly 33. The horn 31 is electrically connected by the movable electrodes 41 and fixed electrodes 42. The first gear 38 is mounted on the steering wheel 32 by utilizing the space afforded by clearance A.

The sensor case 44 is inserted into and fixed in the opening 43 formed in the lower cover 36. Mounted in the sensor case 44 is the variable resistor 40, whose rotary shaft 45 has the second gear 39 secured thereto. The first gear 38 is meshed with the second gear 39.

FIG. 2 shows the structure for mounting the sensor case 44. First, the two L-shaped fittings 46 are inserted into the opening 43 of lower cover 36, and each fitting is aligned with the respective side of the opening 43. The fittings 46 are secured in place by bolts inserted through the bolt holes 47 in the fittings 46 and the bolt holes 48 in the lower cover 36. Next, the sensor case 44 is inserted between the two L-shaped fittings 46 and is fixedly secured to these fittings by bolts passed through the slots 50 in sensor case 44 and the bolt holes 49 in the fittings 46.

In the operation of the steering sensor, the rotary shaft 45 of the variable resistor 40 is rotated via the first and second gears 38, 39 when the steering wheel 32 is turned. The angle through which the rotary shaft 45 has been rotated, namely the absolute steering angle, can be sensed by detecting the corresponding resistance value of the variable resistor 40.

It should be noted that the present invention is not limited to the foregoing embodiment but can be modified in various ways.

For example, in the embodiment described above, the steering sensor is applied to a navigation system. However, the steering sensor can also be applied to an arrangement in which the condition of the road surface ahead of the vehicle is detected and control effected accordingly in order to stabilize the maneuverability of a four-wheel drive vehicle.

Further, though the sensor case 44 is secured to the lower cover 36 in the above-described embodiment, it is permissible to secure the sensor case 44 to the upper cover 35.

Thus, as will apparent from the foregoing description, the present invention makes it possible to readily mount a steering sensor on various types of vehicle. The steering sensor can be widely utilized in navigation and other systems which require such a sensor.

What we claim is:

1. A steering sensor for an automotive vehicle having a steering wheel and a turn signal switch assembly, comprising:
    a first gear mounted in a clearance between the steering wheel and the turn signal switch assembly;
    a second gear meshing with said first gear; and
    a variable resistor rotated by said second gear.

2. The steering sensor according to claim 1, further comprising a sensor case in which said second gear and said variable resistor are fixedly secured, said sensor case being inserted into and secured within an opening formed in a lower cover of a steering column.

* * * * *